US006415140B1

(12) United States Patent
Benjamin et al.

(10) Patent No.: US 6,415,140 B1
(45) Date of Patent: Jul. 2, 2002

(54) NULL ELIMINATION IN A SPACE DIVERSITY ANTENNA SYSTEM

(75) Inventors: James A. Benjamin, Verona; Joseph F. Camerlin, Pequannock; David M. Cooper, Wayne, all of NJ (US)

(73) Assignee: BAE Systems Aerospace Inc., Wayne, NJ (US)

( * ) Notice: Subject to any disclaimer, the term of this patent is extended or adjusted under 35 U.S.C. 154(b) by 0 days.

(21) Appl. No.: 09/561,421

(22) Filed: Apr. 28, 2000

(51) Int. Cl.[7] ................................................ H04B 17/02

(52) U.S. Cl. ....................... 455/275; 455/273; 455/137; 455/276.1

(58) Field of Search ................................ 455/137, 138, 455/272, 273, 275, 276.1–278.1, 304; 375/347

(56) References Cited

U.S. PATENT DOCUMENTS

| | | | | | |
|---|---|---|---|---|---|
| 4,373,210 | A | * | 2/1983 | Karabinis et al. | 455/276.1 |
| 4,512,034 | A | * | 4/1985 | Greenstein et al. | 455/139 |
| 4,723,321 | A | * | 2/1988 | Saleh | 455/295 |
| 5,577,265 | A | * | 11/1996 | Wheatley, III | 455/276.1 |

* cited by examiner

*Primary Examiner*—Nguyen T. Vo
*Assistant Examiner*—Duc Nguyen
(74) *Attorney, Agent, or Firm*—David L. Davis; Edward A. Onders

(57) ABSTRACT

A space diversity antenna system provided with dither circuitry in the signal path to one of the antennas to switch a circuit element in and out of the signal path at a high rate. The circuit element can be an amplitude attenuator or a phase changer. This switching results in the substantial elimination of nulling between the two antennas.

11 Claims, 7 Drawing Sheets

NULL ELIMINATION IN A SPACE DIVERSITY ANTENNA SYSTEM

BACKGROUND OF THE INVENTION

This invention relates to a space diversity antenna system and, more particularly, to an improvement to such a system which substantially eliminates nulling between multiple antennas.

Effective communications to and from airborne platforms often require multiple antennas. This requirement is imposed both by the beams formed by antennas having gain and the shadowing of the antenna pattern by the airframe as a function of aircraft attitude. When the exact location of a single communication partner is known, it is possible to switch between multiple antennas. However, in a more general case, when the location is not known or when there are multiple partners, simple switching is not effective. In these cases, RF energy must be simultaneously provided to all antennas. This will result in conditions where the energy received, on the airborne platform at both antennas or at the partners' antennas from both airborne antennas, will create a null. This null results from two paths having equal amplitudes but opposite phases. In these nulls, communication is not possible. It would therefore be desirable to provide an arrangement wherein the effect of these nulls is effectively removed electronically with minimal impact on system hardware and cost and which allows for effective communications to and from airborne platforms utilizing multiple antennas that are simultaneously operated.

Multiple antennas are commonplace on airborne platforms. Elimination of the interference pattern that arise from simultaneous activation has also been a common problem. In the past, interference patterns, or nulling, has been addressed by:

Switching between antennas;

Using full space diversity;

Using multiple frequencies; and

Sending data redundantly (i.e., multiple times).

Each of these approaches has disadvantages. Thus, switching between antennas requires a knowledge of the relative location of the communication partner and precludes multiple partners. Full space diversity requires multiple antennas at all sites, increasing system cost and complexity. Use of multiple frequencies increases system complexity, cost, and may reduce data throughput. Finally, sending data redundantly reduces system data capacity. It would therefore be desirable to provide a system which does not suffer from any of the foregoing disadvantages by requiring a minimum of additional hardware and which is applicable to all wireless communication systems.

SUMMARY OF THE INVENTION

According to the present invention, a space diversity antenna system operating at a predetermined block rate comprises a first antenna and a second antenna spaced from the first antenna. The system also includes a source of signals to be radiated from the first and second antennas and circuitry using signals received by the first and second antennas. A transceiver is coupled to the source, the circuitry, the first antenna and the second antenna. The transceiver is adapted to split and route signals from the source to the first and second antennas and to combine and route signals from the first and second antennas to the circuitry. Dither circuitry is interposed in the signal path between the transceiver and one of the first and second antennas. The dither circuitry is arranged to alternately insert and remove a circuit element in the signal path at a submultiple of the block rate. The circuit element is selected from the group consisting of an amplitude attenuator and a phase changer.

In accordance with an aspect of this invention, the system is mounted to an aircraft having a major longitudinal axis and further comprises an inertial sensor providing signals indicative of aircraft attitude about the axis, and an angular positioner including a motor. The positioner is coupled to one of the first and second antennas and is adapted to rotate that one antenna about the axis. A motor controller is coupled between the inertial sensor and the positioner motor and is arranged to receive sensor signals and control the motor to maintain the one antenna at a substantially fixed attitude in inertial space.

In accordance with another aspect of this invention, the dither circuitry comprises a plurality of circuit elements each of the same type and of a different value, and a plurality of pairs of PIN diodes. Each pair of PIN diodes flanks a respective circuit element with the anodes of each pair of PIN diodes being each coupled to a respective end of a respective circuit element.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

When radio frequency energy is received from multiple sources on a single antenna, the two signals have an amplitude which is determined by the energy radiated and the path loss. For most practical situations, the path losses from multiple antennas on a single airborne platform to a common antenna are identical. The instantaneous phase of the signal at the common antenna contains a phase term due to the modulation, the internal cabling, and the path length. Only the phase variation due to path length changes as the position of the platform changes. When there are upper and lower antennas on a single airborne platform, if the amplitudes of the two signals are equal and the path difference between the upper antenna and the lower antenna is one half wavelength, the energy at the common antenna will cancel. In a similar manner, if a common antenna transmits to two antennas and the amplitudes of the received signals are equal while the path lengths differ by one half wavelength, the combined signals at the airborne platform will cancel.

Figure 1:
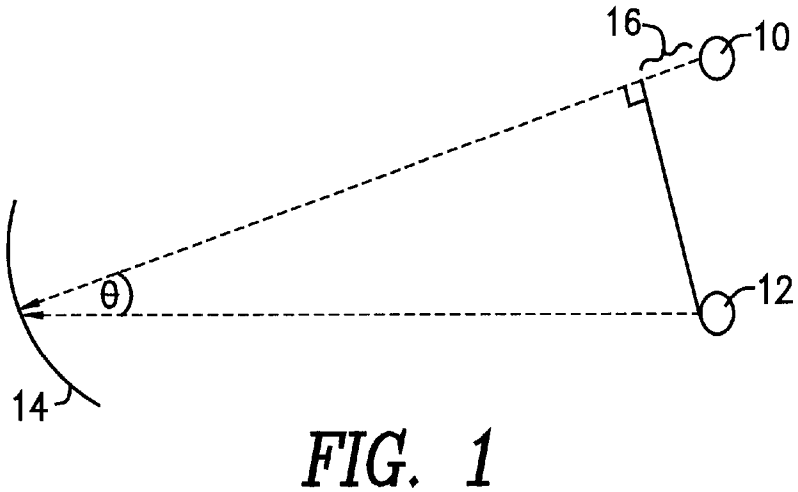
FIG. 1 is a simplified drawing illustrating how a pair of spaced antennas communicating with a single antenna results in a phase difference of the signals received by, or transmitted from, the spaced antennas.

The foregoing is illustrated in FIG. 1 where two antennas 10, 12 are transmitting simultaneously to the antenna 14. The path length difference 16 is a function of the separation between the antennas 10, 12 (which is fixed on a specific platform) and the subtended angle θ between them (which is a function of the range between the antennas 10, 12 and the antenna 14). As the range changes, the path length difference changes. When this path length difference is equal to (or close to being equal to) an odd multiple of the half wavelength of the signal and the amplitudes of the received signals (which are determined by the antenna patterns) are equal (or close to being equal), then the signals from both antennas 10, 12 will cancel.

Figure 2:
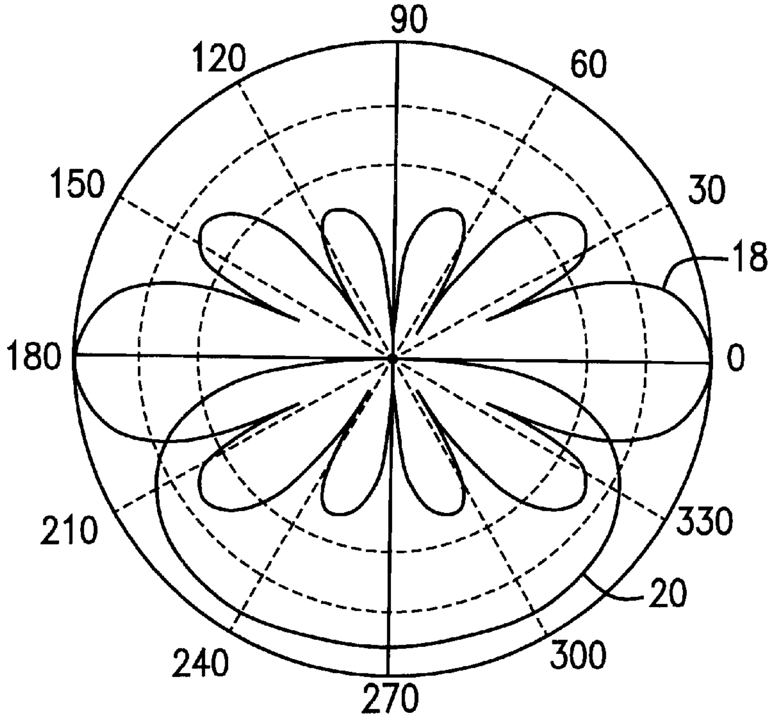
FIG. 2 illustrates a plot of typical antenna patterns for an airborne system.

FIG. 2 illustrates a plot of typical antenna patterns for an airborne system and clearly shows the need for dual antennas on an airborne platform. As shown by the plot 18, one of the antennas, with a relatively higher gain, has its radiation pattern pointed at the horizon. This allows adequate link performance at maximum range. The second antenna, with its plot shown at 20, has lower gain and a rather wide beam, allowing coverage in a nearly hemispheric pattern below the platform, thus "filling in" the performance area when the platform is close to the ground antenna. Note that there are also multiple lobes beneath the aircraft and that, depending on the level of coupling to the broadbeam antenna (plot 20), a number of places where the radiated power received at the ground antenna could be equal. The result of this is that, depending upon the path length difference between the two different antennas, communication may not be possible in a number of null regions.

Modern communications systems use complex phase modulation methods. These systems also use convolutional coding to reduce the bit error rate to acceptable levels ($<10^{-6}$) under marginal conditions. Various coding rates are used. Three quarters and one half rate codes are common, with one half rate being the most common. This implies that, under conditions of strong signals, as much as fifty percent of the data sent can be "lost" without significantly increasing the error rate. In addition to being coded, the data is also interleaved. This means that the position of bits in the transmitted data stream is not in the same temporal relationship as the initial data. On the receive side, the data is de-interleaved to reconstruct the initial data. This results in block erasures being spread over the de-interleaved data stream and insures that the decoding will properly correct errors. When a two antenna radiating (or receiving) system has a null problem, it occurs under conditions where the signal strength on a single antenna would be more than adequate, i.e., it occurs at modest range—not at maximum range. The condition for this null is, again, equal (or nearly equal) amplitude and 180° phase difference. Therefore, the null problem could be alleviated if either the phase or the amplitude of the signal transmitted from one of the antennas were "dithered" in an appropriate manner. For an interleaving depth of 1,024 symbols, the dithering rate would be a small sub-multiple of the block size (½ or ⅓).

Figure 3:
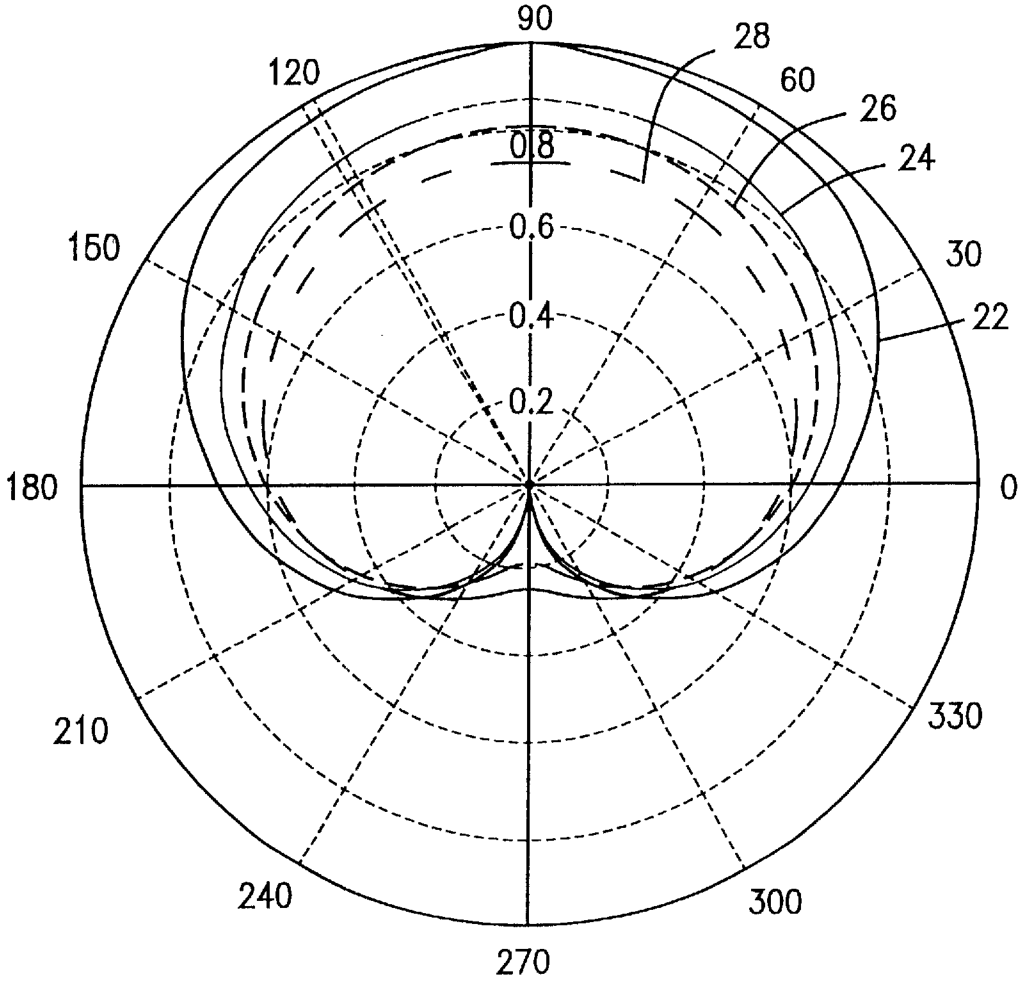
FIG. 3 illustrates the null depth from two signals of equal phase as a function of amplitude difference.

FIG. 3 illustrates the null depth from two signals of equal phase as a function of amplitude difference. In FIG. 3, the plot 22 is for equal amplitude signals; the plot 24 is for signals with an amplitude difference of 1 dB; the plot 26 is for signals with an amplitude difference of 2 dB; and the plot 28 is for signals with an amplitude difference of 3 dB. It is apparent from FIG. 3 that differences in both phase and amplitude can mitigate the depth of the nulls created by two antennas. Thus, a 2 dB amplitude dither limits the null depth to 13 dB, equivalent to a phase dither of ±20°, and a 3 dB amplitude dither limits the null depth to 12 dB, equivalent to a phase dither of ±30°. A phase dither of ±90° limits the null depth to 6 dB and a 180° phase dither results in no null at all but would also introduce nulls to receivers where normally no nulls would be present. These phase dithers are sufficient in magnitude that they would totally corrupt the data if they were implemented on a long-term basis. To mitigate the effect of long term dithering, the dither rate is set such that the interleaver and error correction coding would correct for lost data and retain some margin for unrelated burst or random errors. For a 10.7 Mb/s QPSK signal, the symbol time is 0.187 μs. Using a half block rate as the dithering rate, the phase or amplitude would change every 38.2 μs.

Figure 4:
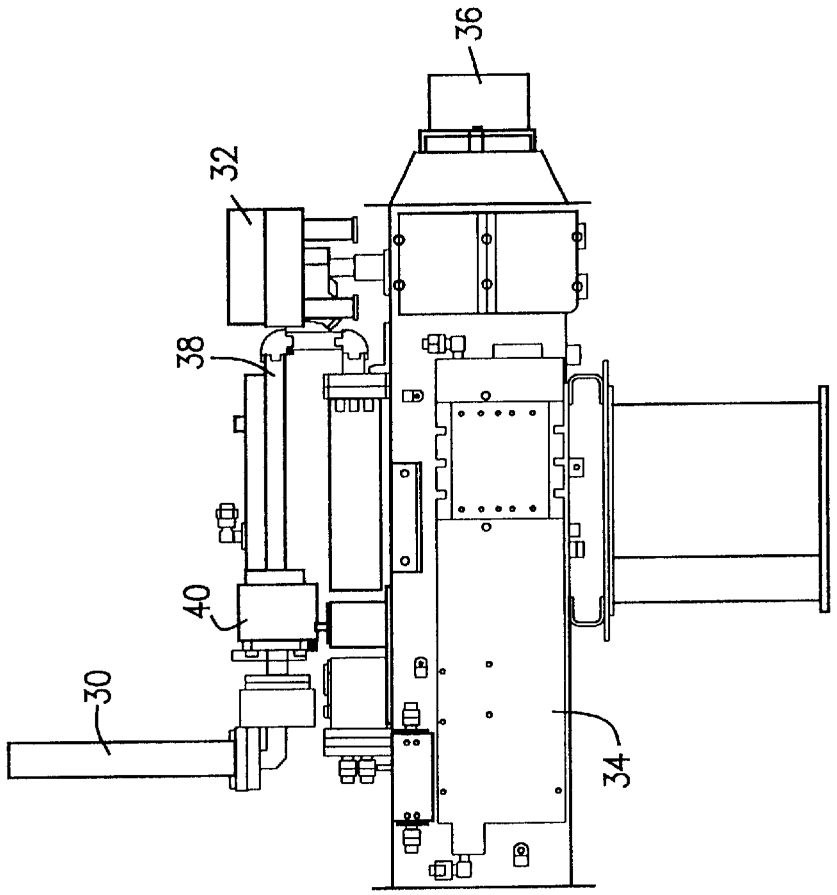
FIG. 4 is a side view of illustrative mechanical structure embodying the present invention.
Figure 5:
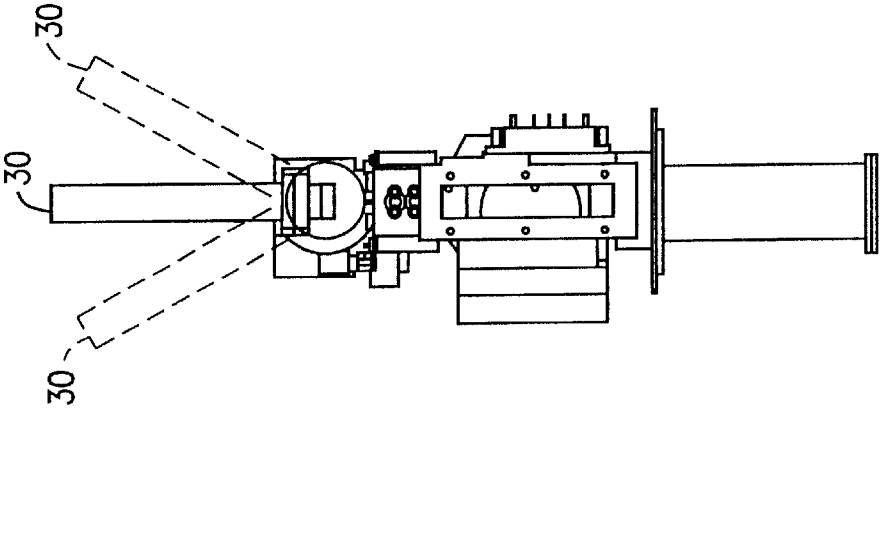
FIG. 5 is an end view of the structure shown in FIG. 4 illustrating an illustrative angular range of motion of one of the antennas.
Figure 6:
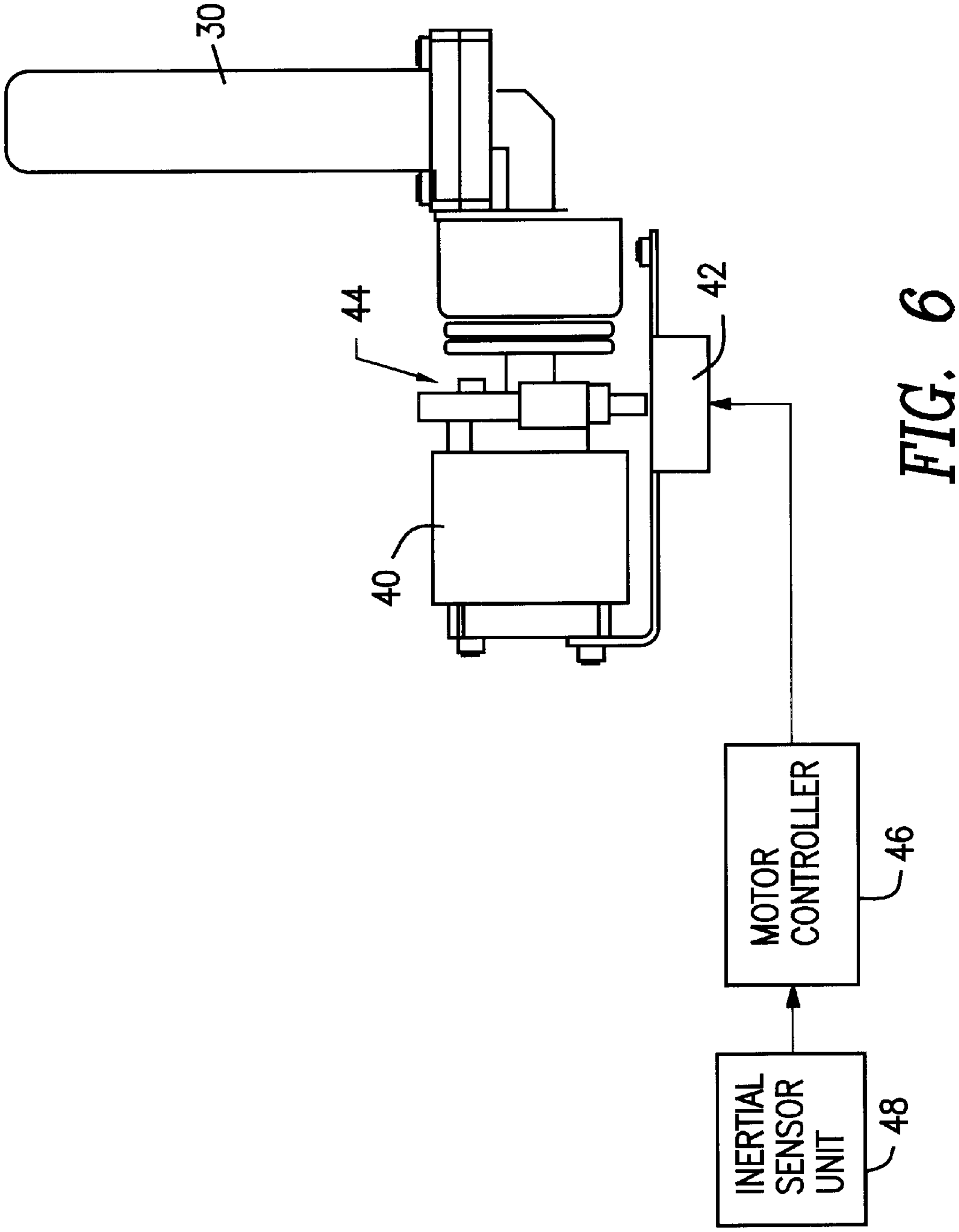
FIG. 6 schematically illustrates a system for rotating the one antenna.

FIGS. 4 and 5 show illustrative mechanical structure embodying the present invention. The structure shown in FIGS. 4 and 5 is adapted for mounting within an aircraft and includes an omnidirectional antenna 30 which generates the radiation plot 18 (FIG. 2) and a hemispherical antenna 32 which generates the radiation plot 20 (FIG. 2). In order that the antenna 30 remain aligned with the horizon during banking maneuvers of the aircraft, the antenna 30 is movable within an angular range of approximately ±30°. The electronics coupled to the antennas 30, 32 is housed within the enclosure 34 and is cooled by a fan 36. A waveguide 38 carries radio frequency signals between the antenna 30 and the electronics within the enclosure 34 and is coupled to the antenna 30 through a torsional joint 40 to accommodate angular positioning of the antenna 30. As shown in FIG. 6, a stabilizer motor 42 moves the antenna 30 through a gear train 44. The motor 42 is controlled by a controller 46 which responds to signals generated by an inertial sensor unit 48 to compensate for aircraft roll in order to maintain the radiation pattern of the antenna 30 pointing to the horizon.

Figure 7:
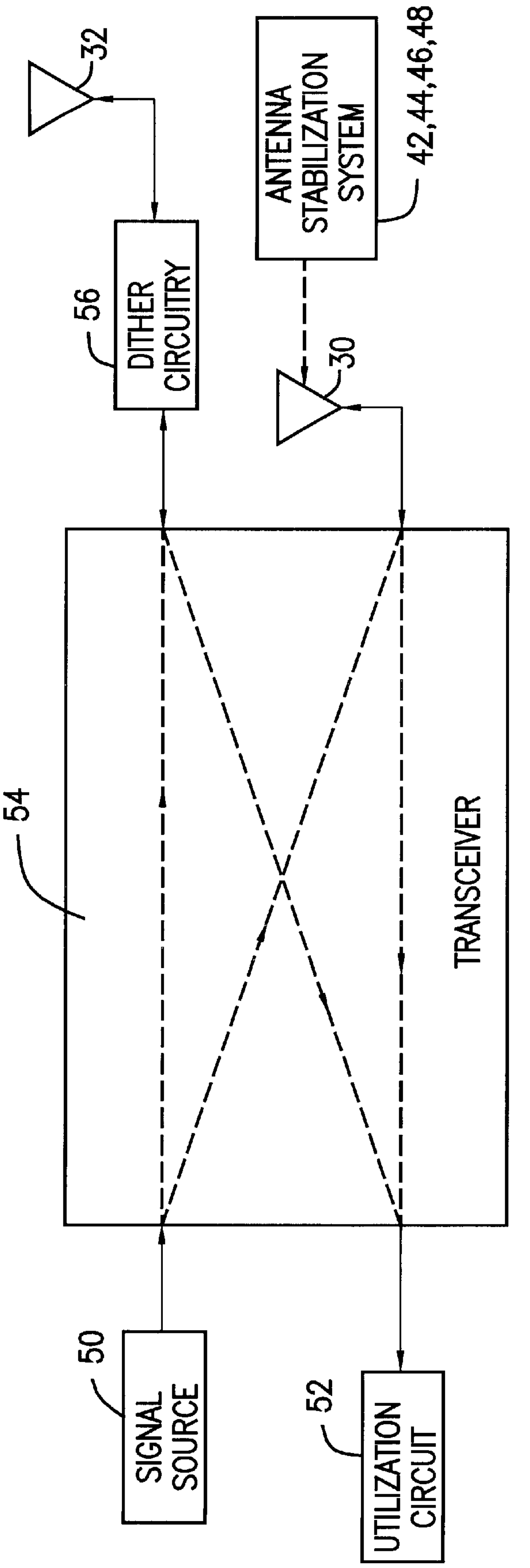
FIG. 7 is a block diagram showing electrical components of the inventive system.

As shown in FIG. 7, the antennas 30, 32 are coupled to the signal source 50 and the utilization circuit 52 through the transceiver 54. As is conventional, the transceiver 54 splits signals from the signal source 50 and routes them to the antennas 30, 32 and also combines signals from the antennas 30, 32 and routes them to the utilization circuit 52. According to the principles of this invention, dither circuitry 56 is interposed in the signal path between the transceiver and one of the antennas 30, 32. Preferably, the dither circuitry 56 is interposed between the transceiver 54 and the antenna 32, which is the lower gain antenna.

As discussed above, the dither can be either amplitude dither or phase dither. Thus, the dither circuitry 56 functions to alternately insert and remove a circuit element in the signal path to the antenna 32 at a submultiple of the block rate. The circuit element can be either an amplitude attenuator (FIG. 8) or a phase changer (FIG. 9).

Figure 8:
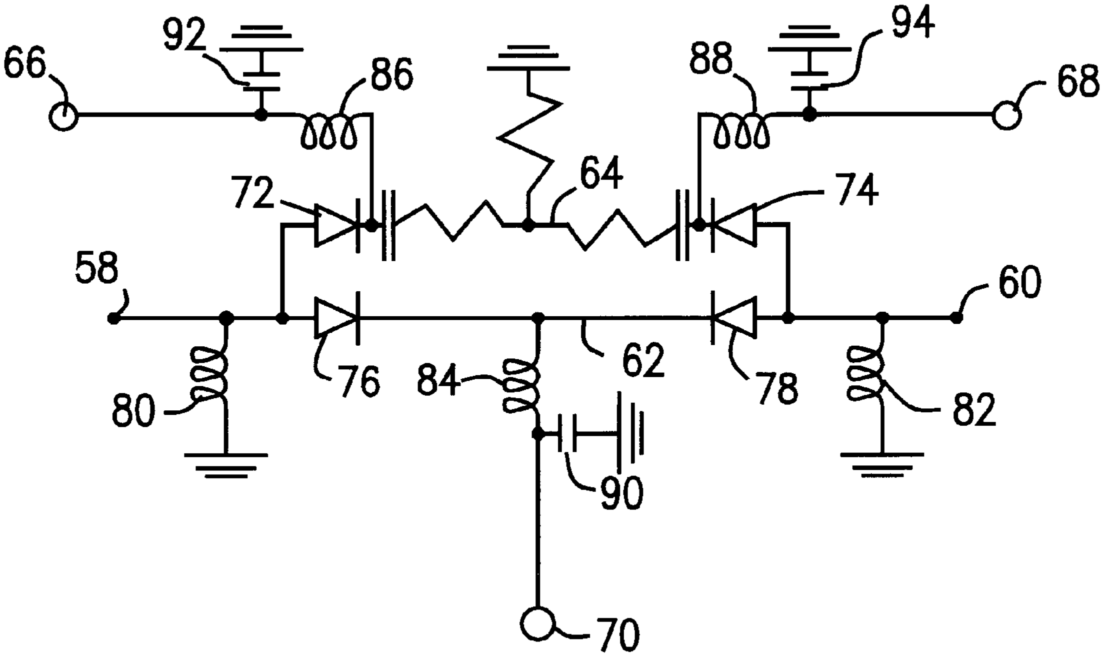
FIG. 8 illustrates an embodiment of the inventive dither circuitry using attenuators.

FIG. 8 illustrates an embodiment of the dither circuitry 56 which provides amplitude dither to the signal in the signal path between the transceiver 54 and the antenna 32. The terminal 58 is connected to the transceiver 54 and the terminal 60 is connected to the antenna 32. Illustratively, the dither circuitry shown in FIG. 8 operates to provide a dual path, the path 62 being unattenuated and the path 64 having a constant impedance "T" attenuator, which can illustratively be set to 2 dB. The control terminals 66, 68, 70 are connected to a controller such as a programmed computer, which provides biasing signals for the PIN diodes 72, 74, 76 and 78, which are arranged in pairs to flank the paths 62 and 64 and with their cathodes each connected to a respective path end. The anodes of the PIN diodes 72 and 76 are connected together and to the terminal 58. Likewise, the anodes of the PIN diodes 74 and 78 are connected together and to the terminal 60. The inductors 80 and 82 are connected to the terminals 58 and 60, respectively, and return DC current to ground while providing a high impedance for radio frequency signals. The inductors 84, 86 and 88 feed DC voltage to the diodes 72, 74, 76 and 78 while again providing a high impedance for radio frequency signals. The capacitors 90, 92 and 94 provide bypass paths for radio frequency signals. When the diodes 76 and 78 are forward biased, and the diodes 72 and 74 are reversed biased, then the radio frequency signal path is through the unattenuated path 62. When the diodes 76 and 78 are reversed biased and the diodes 72 and 74 are forward biased, the radio frequency path is through the "T" attenuator path 64. This approach can be extended to more than two paths and more than one value of attenuation. By changing the voltages on the various terminals 66, 68 and 70, more or less attenuation (amplitude) can be switched in or out.

Figure 9:
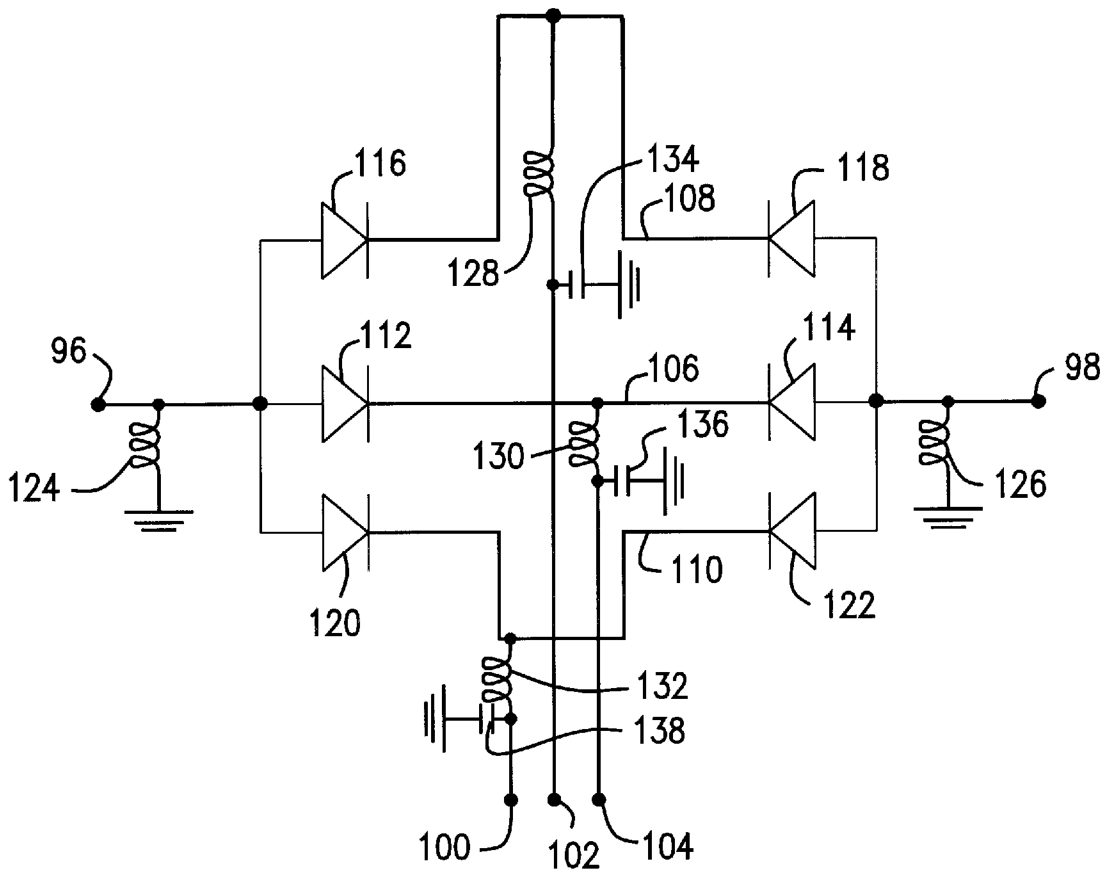
FIG. 9 illustrates an embodiment of the inventive dither circuitry using phase changers.

FIG. 9 shows an embodiment of the dither circuitry 56 wherein the phase of the signal passing between the transceiver 54 and the antenna 32 is changed. This is accomplished by selectively switching different valued delay lines into and out of the signal path. As shown, the terminal 96 is connected to the transceiver 54 and the terminal 98 is connected to the antenna 32. The control terminals 100, 102 and 104 are connected to a controller, such as a programmed computer. Illustratively, three paths are provided. The path 106 has the least amount of delay (phase change); the path 108 has the greatest amount of delay; and the path 110 has an intermediate amount of delay. The path 106 is controlled by controlling the bias on the PIN diodes 112 and 114; the path 108 is controlled by controlling the bias on the PIN diodes 116 and 118; and the path 110 is controlled by controlling the bias on the PIN diodes 120 and 122. The PIN diodes 112, 114, 116, 118, 120 and 122 are connected in a similar manner as the PIN diodes 72, 74, 76 and 78 (FIG. 8). The inductors 124 and 126 return DC current to ground while providing a high impedance for radio frequency signals. The inductors 128, 130 and 132 feed DC voltage to the diodes 112, 114, 116, 118, 120 and 122 while providing a high impedance to radio frequency signals. The capacitors 134, 136 and 138 provide bypass paths for radio frequency signals. At any given time, two of the terminals 100, 102 and 104 are biased positively and only one is biased negatively. The positive voltage reverse biases the diodes to which it is connected, which then appear as open circuits. The single negative bias line forward biases the diodes to which it is connected, which appear as short circuits. Thus, one path and only one path is connected. By changing the voltages on the terminals 100, 102 and 104, more or less delay (phase) can be switched in or out.

Accordingly, there has been disclosed an arrangement which substantially eliminates nulling between multiple antennas. While illustrative embodiments of the present invention have been disclosed herein, it will be apparent to one of skill in the art that various adaptations and modifications to the disclosed embodiments are possible, and it is intended that this invention be limited only by the scope of the appended claims.

What is claimed is:

1. A space diversity antenna system operating at a predetermined block rate, comprising:

a first antenna;

a second antenna spaced from said first antenna;

a source of signals to be radiated from said first and second antennas;

circuitry using signals received by said first and second antennas;

a transceiver coupled to said source, said circuitry, said first antenna and said second antenna, said transceiver adapted to split and route signals from said source to said first and second antennas and to combine and route signals from said first and second antennas to said circuitry; and dither circuitry interposed in the signal path between said transceiver and one of said first and second antennas, said dither circuitry arranged to alternately insert and remove a circuit element in the signal path at a submultiple of the block rate, wherein the circuit element is selected from the group consisting of an amplitude attenuator and a phase changer.

2. The system accordingly to claim 1 wherein said circuit element comprises an amplitude attenuator.

3. The system according to claim 1 wherein said circuit element comprises a delay line.

4. The system according to claim 1 wherein the system is mounted to an aircraft having a major longitudinal axis, the system further comprising:

an inertial sensor providing signals indicative of the aircraft attitude about said axis;

an angular positioner including a motor, said positioner being coupled to one of said first and second antennas and adapted to rotate said one antenna about said axis; and a motor controller coupled between said inertial sensor and said positioner motor and arranged to receive said sensor signals and control said motor to maintain said one antenna at a substantially fixed attitude in inertial space.

5. The system according to claim 4 further comprising:

a torsional waveguide interposed between said source and said one antenna.

6. The system according to claim 1 wherein said dither circuitry comprises:

a plurality of said circuit elements each of the same type and of a different value; and a plurality of pairs of PIN diodes wherein each pair of PIN diodes flanks a respective circuit element with the cathodes of each pair of PIN diodes being each coupled to a respective end of the respective circuit element.

7. The system according to claim 6 further comprising:

a plurality of control terminals each associated with a respective circuit element and each coupled to the cathode of a respective PIN diode;

an inductor coupled between each control terminal and the respective PIN diode cathode; and a capacitor coupled between each control terminal and ground.

8. The system according to claim 7 wherein the circuit element comprises a constant impedance "T" attenuator.

9. The system according to claim 7 wherein:

each of the circuit elements includes a delay line; and each of the control terminals is coupled to a respective delay line through a respective inductor.

10. The system according to claim 6 wherein the anodes of the PIN diodes on each respective end of the respective circuit elements are connected together, the system further comprising:

a plurality of control terminals each associated with a respective circuit element and each coupled to the cathode of a respective PIN diode;

an inductor coupled between each control terminal and the respective PIN diode cathode; and a capacitor coupled between each control terminal and ground.

11. The system according to claim 10 further comprising a respective inductor coupled between ground and each group of connected PIN diode anodes.

* * * * *